(12) United States Patent
He et al.

(10) Patent No.: US 12,588,075 B2
(45) Date of Patent: *Mar. 24, 2026

(54) BASE STATION OPERATIONS FOR REDUCED CAPABILITY USER EQUIPMENT

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Jie Cui, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 371 days.

This patent is subject to a terminal disclaimer.

(21) Appl. No.: 17/593,461

(22) PCT Filed: Aug. 5, 2020

(86) PCT No.: PCT/CN2020/107230

§ 371 (c)(1),
(2) Date: Sep. 19, 2021

(87) PCT Pub. No.: WO2022/027378

PCT Pub. Date: Feb. 10, 2022

(65) Prior Publication Data

US 2022/0304074 A1     Sep. 22, 2022

(51) Int. Cl.
*H04W 74/08* (2024.01)
*H04L 1/08* (2006.01)
(Continued)

(52) U.S. Cl.
CPC .......... *H04W 74/0841* (2013.01); *H04L 1/08* (2013.01); *H04W 72/02* (2013.01);
(Continued)

(58) Field of Classification Search
CPC ............. H04W 74/0841; H04W 72/02; H04W 72/0453; H04W 74/0866; H04W 74/006;
(Continued)

(56) References Cited

U.S. PATENT DOCUMENTS

| | | |
|---|---|---|
| 11,818,699 B2 | 11/2023 | Lee et al. |
| 11,832,350 B2 | 11/2023 | Hu et al. |

(Continued)

FOREIGN PATENT DOCUMENTS

| | | |
|---|---|---|
| CN | 107211015 A | 9/2017 |
| CN | 109156036 | 1/2019 |

(Continued)

OTHER PUBLICATIONS

Vivo, "Discussion on initial access procedure for NR-U", 3GPP TSG RAN WG1 #98, R1-1908141, Aug. 17, 2019, 7 sheets.

(Continued)

*Primary Examiner* — Faruk Hamza
*Assistant Examiner* — Aixa A Guadalupe Cruz
(74) *Attorney, Agent, or Firm* — Fay Kaplun & Marcin, LLP

(57) ABSTRACT

A base station of a network may bar access to certain types of user equipment (UE). The base station broadcasts a system information block (SIB) identifying a plurality of random access channel (RACH) sub-bands of an uplink (UL) bandwidth and which of the plurality of RACH sub-bands includes physical random access channel (PRACH) resources and receives, from the UE, a preamble from one of the plurality of RACH sub-bands selected by the UE.

17 Claims, 8 Drawing Sheets

PRACH Format 802    PDCCH Repetition Scheduling Msg2 804    Msg2 Repetition 806    Msg 3 Repetition 808

$K_{PRACH}=3$    $K_{PDCCH,Msg2}=3$    $K_{Msg2}=3$    $K_{Msg3}=3$

(51) Int. Cl.

| | |
|---|---|
| *H04W 72/02* | (2009.01) |
| *H04W 72/0453* | (2023.01) |
| *H04W 74/0833* | (2024.01) |

(52) U.S. Cl.
CPC ... *H04W 72/0453* (2013.01); *H04W 74/0833* (2013.01); *H04W 74/0866* (2013.01)

(58) Field of Classification Search
CPC .... H04W 48/12; H04W 74/0833; H04L 1/08; H04L 1/1864; H04L 1/189; H04L 5/003; H04L 5/0096; H04L 5/001
See application file for complete search history.

(56) References Cited

U.S. PATENT DOCUMENTS

| | | | | |
|---|---|---|---|---|
| 11,882,548 | B2 * | 1/2024 | Höglund ........... | H04W 74/0833 |
| 2014/0098761 | A1 | 4/2014 | Lee et al. | |
| 2016/0212737 | A1 | 7/2016 | Jang et al. | |
| 2018/0213518 | A1 | 7/2018 | Jang et al. | |
| 2019/0159259 | A1 | 5/2019 | Kim et al. | |
| 2019/0190668 | A1 | 6/2019 | Lei et al. | |
| 2020/0077435 | A1 | 3/2020 | Kim et al. | |
| 2020/0221506 | A1 | 7/2020 | Jeon et al. | |
| 2020/0267770 | A1 | 8/2020 | Islam et al. | |
| 2021/0274550 | A1 * | 9/2021 | Zhang ................... | H04W 80/02 |
| 2022/0304058 | A1 | 9/2022 | Wang et al. | |
| 2023/0060894 | A1 * | 3/2023 | Rastegardoost .... | H04W 56/001 |
| 2023/0085104 | A1 * | 3/2023 | Park .................... | H04W 74/008 |
| | | | | 370/329 |
| 2023/0179385 | A1 | 6/2023 | Wang et al. | |
| 2023/0188261 | A1 * | 6/2023 | Awadin ................. | H04L 1/1864 |
| | | | | 370/329 |
| 2023/0209542 | A1 * | 6/2023 | Wang .................... | H04W 72/23 |
| | | | | 370/329 |
| 2023/0224953 | A1 | 7/2023 | Xiong et al. | |
| 2023/0262753 | A1 * | 8/2023 | Axnäs ................. | H04W 74/008 |
| | | | | 370/329 |
| 2023/0308905 | A1 | 9/2023 | Teyeb et al. | |

FOREIGN PATENT DOCUMENTS

| | | |
|---|---|---|
| CN | 110636613 A | 12/2019 |
| CN | 110999392 | 4/2020 |
| WO | 2019118733 A1 | 6/2019 |

OTHER PUBLICATIONS

Intel Corporation, "PRACH Preamble and Resource Allocation", 3GPP TSG RAN WG1 Meeting RAN1 #88, R1-1702184, Feb. 17, 2017, 5 sheets.

NTT Docomo, Inc., "Discussion on 4-step random access procedure for NR", 3GPP TSG RAN WG1 AH_NR Meeting, R1-1700614, Jan. 20, 2017, 7 sheets.

Ericsson, "Optional configuration in NR system information", 3GPP TSG-RAN WG2 #102, R2-1807100, May 25, 2018, 3 sheets.

Huawei Hisilicon, "RACH Procedures for Unified Single and Multiple Beam Based Access", 3GPP TSG RAN WG1 Meeting #87, R1-1611669, Nov. 18, 2016, 5 sheets.

Ericsson, "Data transmission during random access procedure for NB-IoT", 3GPP TSG-RAN WG1 Meeting #93, R1-1805857, May 11, 2018, 3 sheets.

Ericsson, "Early data transmission for MTC", 3GPP TSG-RAN WG1 Meeting #93, R1-1805850, May 20, 2018, 7 sheets.

* cited by examiner

Method 700

900

902

904

BASE STATION OPERATIONS FOR REDUCED CAPABILITY USER EQUIPMENT

BACKGROUND 5G new radio (NR) wireless communications support a variety of different types of user equipment (UEs). For example, in addition to mobile phones, 5G NR supports internet of things (IoT) devices, industrial IoT (IIoT) devices, wearable devices, etc. Some of these devices are known as reduced capability (RedCap) UEs, which have varying wireless capabilities compared to other UEs.

SUMMARY

Some exemplary aspects are related to a base station having a processor and a transceiver communicatively connected to the processor. The processor is configured to perform operations that include broadcasting a system information block (SIB) identifying a plurality of random access channel (RACH) sub-bands of an uplink (UL) bandwidth and which of the plurality of RACH sub-bands includes physical random access channel (PRACH) resources and receiving, from the UE, a preamble from one of the plurality of RACH sub-bands selected by the UE.

Other exemplary aspects are related to a baseband processor configured to perform operations. The operations include broadcasting a system information block (SIB) identifying a plurality of random access channel (RACH) sub-bands of an uplink (UL) bandwidth and which of the plurality of RACH sub-bands includes physical random access channel (PRACH) resources and receiving, from a user equipment (UE), a preamble from one of the plurality of RACH sub-bands selected by the UE.

DETAILED DESCRIPTION

Figure 1:
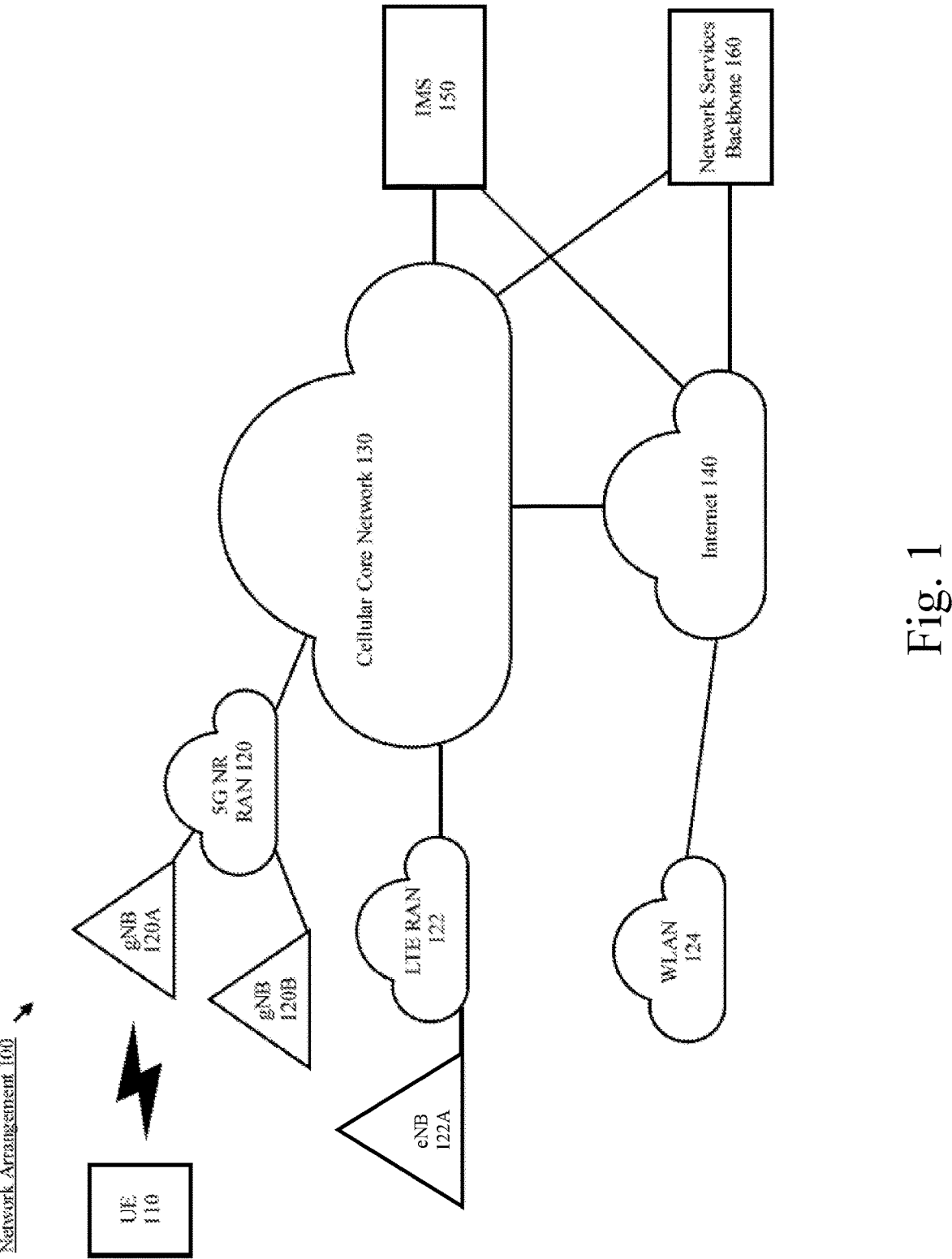
FIG. 1 shows an exemplary network arrangement according to various exemplary aspects.

The exemplary aspects may be further understood with reference to the following description and the related appended drawings, wherein like elements are provided with the same reference numerals. The exemplary aspects describe manners of performing a network access procedure by a reduced capability user equipment (RedCap UE).

The exemplary aspects are described with regard to a network that includes 5G new radio NR radio access technology (RAT). However, the exemplary aspects may be implemented in other types of networks using the principles described herein.

The exemplary aspects are also described with regard to a UE. However, the use of a UE is merely for illustrative purposes. The exemplary aspects may be utilized with any electronic component that may establish a connection with a network and is configured with the hardware, software, and/or firmware to exchange information and data with the network. Therefore, the UE as described herein is used to represent any electronic component.

As noted above, there are various UEs, each having different capabilities that connect to the 5G NR network. However, in a given area, it may not be beneficial to have different UEs having different capabilities camped on the same cell since reduced capability UEs may utilize different parameters for wireless communications (e.g., bandwidth parts, data rates, etc.) than other UEs (e.g., mobile phones, laptops, etc.), meaning the cell would need to tailor its communications to all types of UEs.

Prior to describing the exemplary aspects, several examples of RedCap UEs and their characteristics will be described. In a first example, devices in industrial settings such as temperature or humidity sensors may be connected industry devices. However, such devices are stationary, are not latency critical, and are fairly uncomplex with respect to their capabilities and hardware. These devices typically do not require the low latency data exchange provided by ultra reliable low latency communication (URLLC) or IIoT. It is also expected that these devices will operate in the field for many years with little to no maintenance, including battery replacement. Thus, power saving operations may be critical for these types of devices.

Another example of RedCap type devices with capabilities that differ from other UEs are surveillance devices (e.g., cameras). These devices are similar to the devices in the first example in that they are typically stationary and do not have stringent latency requirements. However, they may differ from the first example because these devices may be connected to a permanent power supply (although not required) and may have much higher upload data rates than many other UEs because of, for example, the video upload feeds they are providing.

Yet another example of RedCap type devices with different capabilities than many other UEs are wearable devices. Unlike the above examples, wearables typically have similar mobility to mobile phones and operations related to the same types of applications that are executable on mobile phones. However, because of the smaller form factor resulting in smaller batteries, these devices have a more stringent power saving requirement than mobile phones.

These examples of different types of UEs are by no means an exhaustive list of 5G-capable devices, but are provided as an example of the varying capabilities of different UEs that are connected to the 5G NR wireless network at any given time. Devices that are considered RedCap devices may be limited in the bandwidth provided to them either by standards (e.g., 3GPP standards) or by individual network providers. As a result of this decreased bandwidth, coverage area may be sacrificed. Although slot aggregation or repetition may be used to compensate for this loss of coverage, such options are not supported prior to the radio resource control (RRC) configuration of the UE. As such, a random access channel (RACH) process of attaching a RedCap UE to a cell is necessary.

According to some exemplary aspects, the 5G NR network may divide the bandwidth part of a component carrier (CC) into smaller bandwidth sub-bands and distribute the physical RACH (PRACH) resources for the RACH procedure among one or more of the sub-bands. As a result, the overhead resources allocated to serve RedCap devices are advantageously reduced while ensuring that these RedCap devices can still successfully attach to a cell.

FIG. 1 shows an exemplary network arrangement 100 according to various exemplary aspects. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
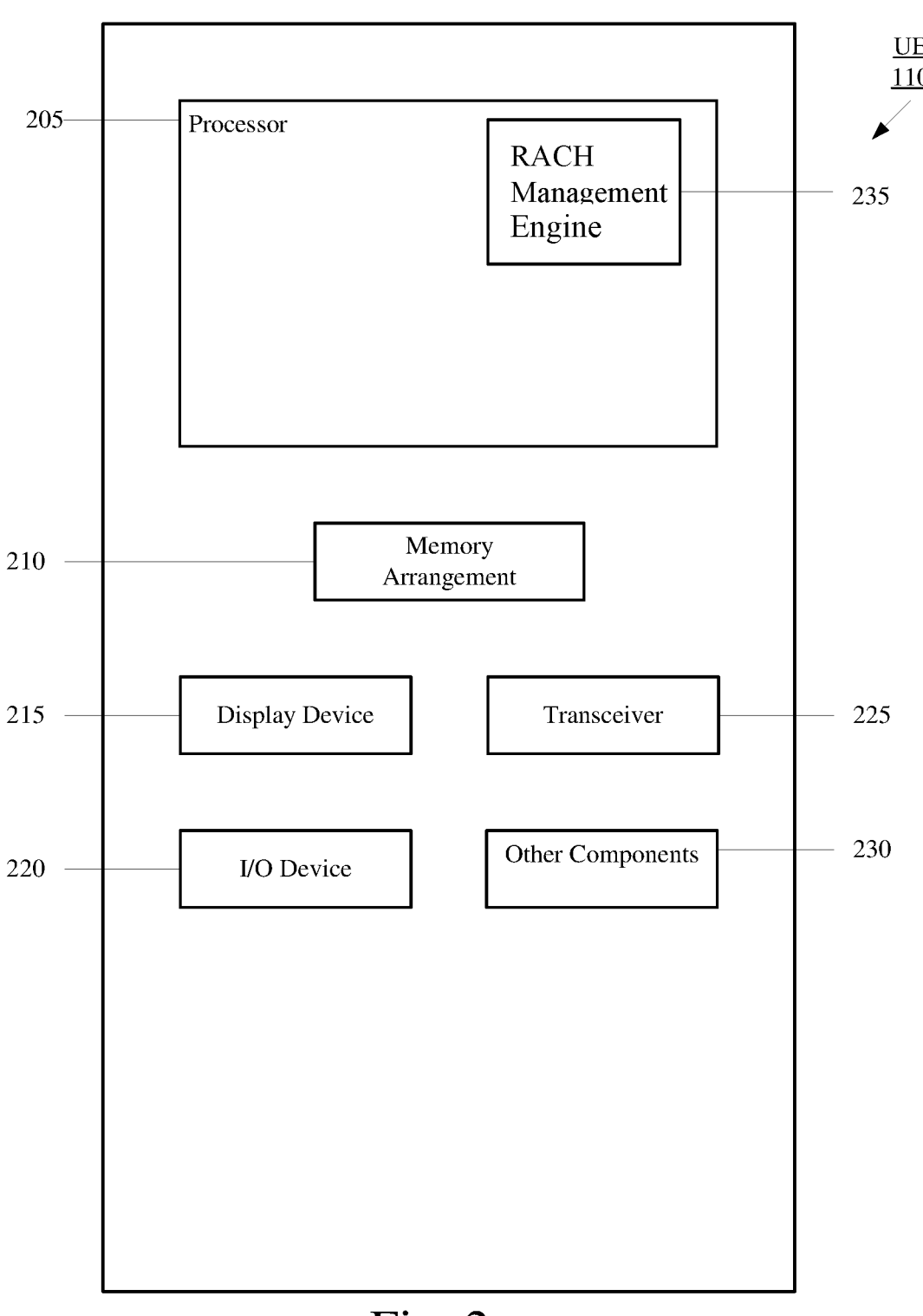
FIG. 2 shows an exemplary UE according to various exemplary aspects.

FIG. 2 shows an exemplary UE 110 according to various exemplary aspects. The UE 110 will be described with regard to the network arrangement 100 of FIG. 1. For purposes of this discussion, the UE 110 may be considered to be a reduced capability (RedCap) UE. However, it should be noted that the UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a RACH management engine 235. As will be described in more detail below, the RACH management engine 235 may perform various operations related to RACH procedure such as, for example, processing system information block 1 (SIB1) to determine the sub-bands carrying PRACH resources, selecting one of the sub-bands for PRACH transmission, etc.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary aspects may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
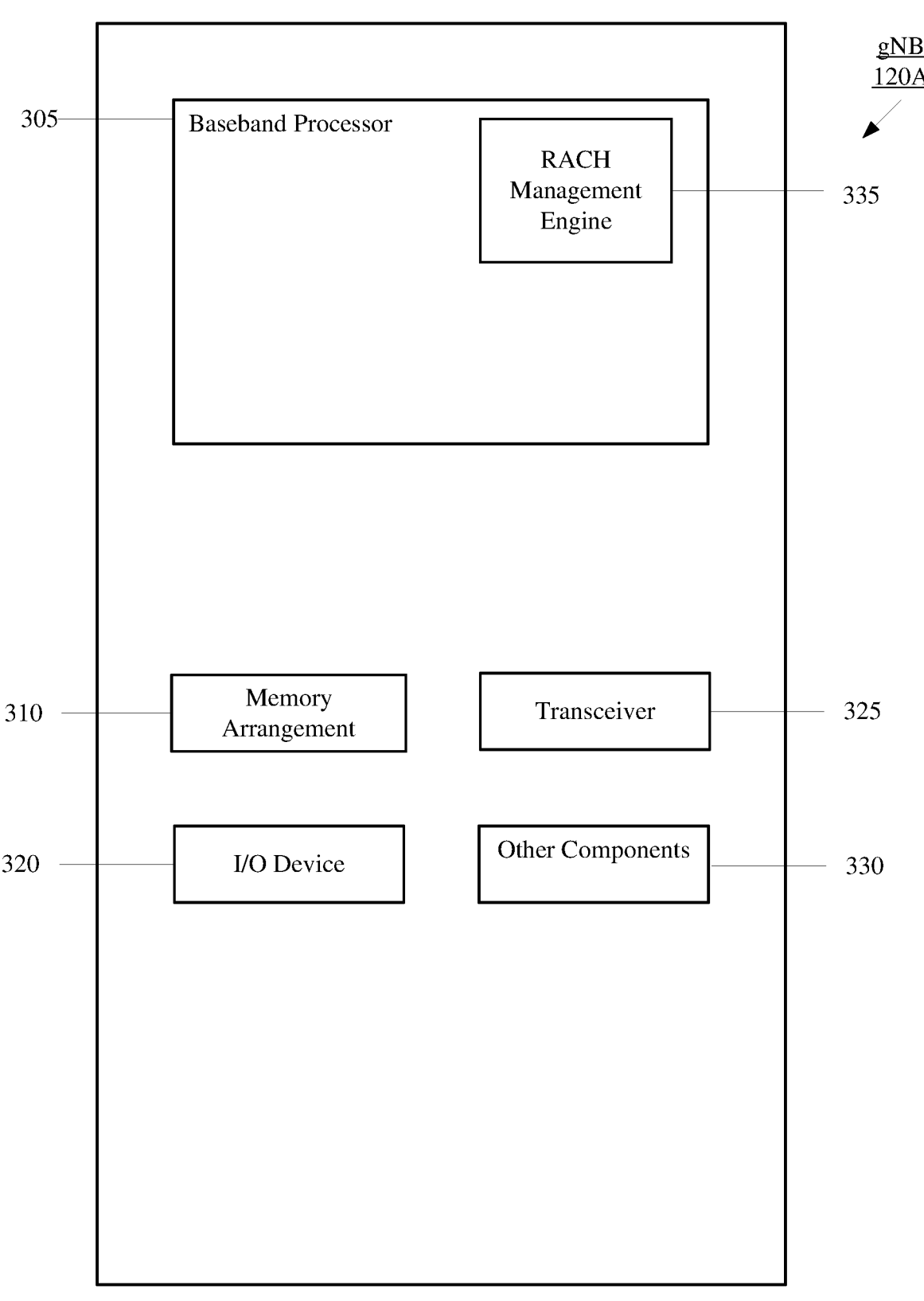
FIG. 3 shows an exemplary base station configured to establish a connection with a user equipment according to various exemplary aspects.

FIG. 3 shows an exemplary network cell, in this case gNB 120A, according to various exemplary aspects. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a RACH management engine 335 for performing operations including managing RACH procedures of RedCap UEs to attach to the gNB 120A. Examples of managing RACH procedures will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
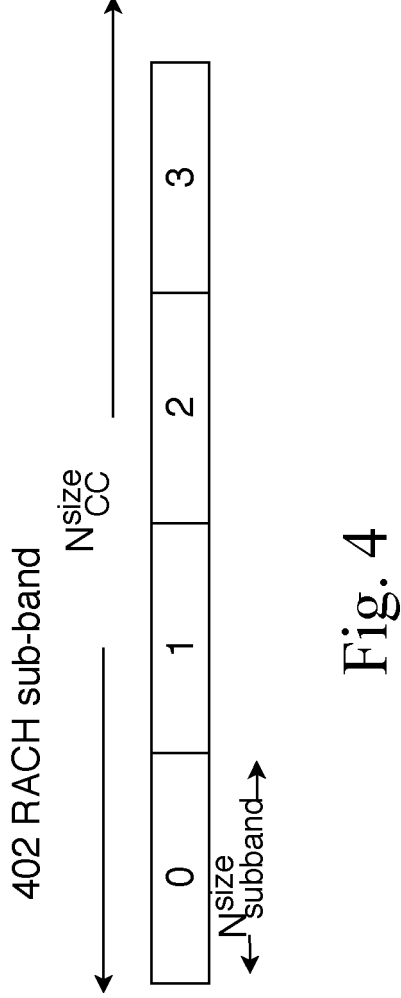
FIG. 4 is a diagram illustrating random access channel (RACH) sub-bands according to various exemplary aspects.

FIG. 4 is a diagram illustrating random access channel (RACH) sub-bands 402 according to various exemplary aspects. The set of RACH sub-bands 402 for RedCap RACH procedures may span either a subset or the entire downlink (DL) component carrier (CC) bandwidth ($N_{cc}^{size}$) configured for a given cell. The exemplary sub-band configuration illustrated in FIG. 4 includes four sub-bands (0, 1, 2, and 3), each having $N_{subband}^{size}$ resource blocks. The value of $N_{subband}^{size}$ may be determined in various ways. For example, in some aspects, $N_{subband}^{size}$ may be configured by the SIB1 received by the RedCap UE 110. For example, the value $N_{subband}^{size}$ may be broadcast in the system information of the SIB1 by the gNB 120A. In some aspects, the value of may alternatively be a function of the DL CC bandwidth. In some aspects, the value of $N_{subband}^{size}$ may alternatively be set by standards (e.g., 3GPP standards) and may be based on the bandwidth capability of the RedCap UE 110 (e.g., 10 MHz or 20 MHz for frequency range 1; and 50 MHz or 100 MHz for frequency range 2) and a subcarrier spacing "u". For example, the value of $N_{subband}^{size,u}$ may be 100/50/25 for a subcarrier spacing "u" of 0, 1, 2 or 136/68 for a subcarrier spacing "u" of 2, 3, 4.

Figure 5:
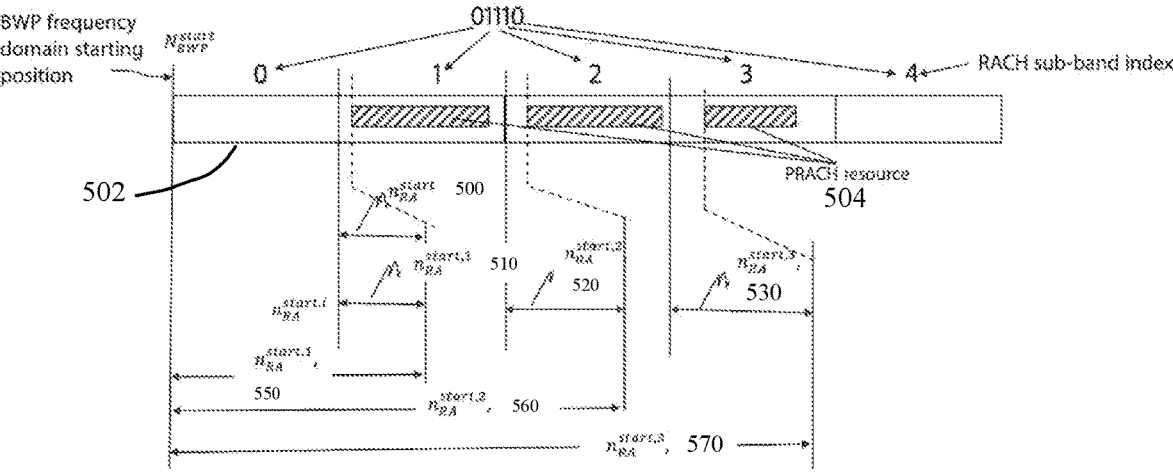
FIG. 5 is a diagram illustrating the allocation of physical RACH (PRACH) resources in RACH sub-bands according to various exemplary aspects.

FIG. 5 is a diagram illustrating the allocation of physical RACH (PRACH) resources 504 in RACH sub-bands 502 according to various exemplary aspects. In some aspects, the set of RACH sub-bands 502 that include the PRACH resources 504 may be identified by the rach-ConfigCommon information element (IE) in the SIB1 broadcast by the gNB 122A. One exemplary abstract syntax notation one (ASN.1) signaling that indicates a set of RACH sub-bands that include PRACH resources may be RACHSubBandList::= BITSTRING(SIZE(maxNrofRACHSubBands)), where "BITSTRING" is a binary string in which a value of 0 indicates that the corresponding sub-band does not include PRACH resources and a value of 1 indicates that the corresponding sub-bands includes PRACH resources. In the example illustrated in FIG. 5, the BITSTRING would have a value of 01110, indicating that the middle three sub-bands (sub-band index 1, 2, and 3) of the five sub-bands 502 include the PRACH resources 504.

In some aspects, various methods may be used to indicate the frequency domain starting position of the respective PRACH resource 504 in each RACH sub-band 502. For example, in some aspects, a single offset value 500 ($n_{RA}^{start}$) is configured by RRC signaling relative to the starting physical resource block (PRB) of each associated RACH sub-band 502 and is used to determine the PRACH resource location in each sub-band. For example, the respective offsets 510 ($n_{RA}^{start,1}$), 520 ($n_{RA}^{start,2}$), and 530 ($n_{RA}^{start,1}$) would all have the same value (e.g., $n_{RA}^{start,3}$). In some aspects, a separate offset value $n_{RA}^{start,i}$ may alternatively be utilized for each respective sub-band. For example, the respective offsets 510 ($n_{RA}^{start,2}$), 520 ($n_{RA}^{start,2}$), and 530 ($n_{RA}^{start,3}$) may each have a different value. In some aspects, separate offsets 550 ($n_{RA}^{start,1}$), 570 ($n_{RA}^{start,2}$), and 580 ($n_{RA}^{start,3}$) may alternatively be configured with respect to a common reference point such as, for example, the starting resource block (RB) for the UL BWP. Having different offset values may allow the gNB 120A to transmit other UL transmission resources during the offset.

Figure 6:
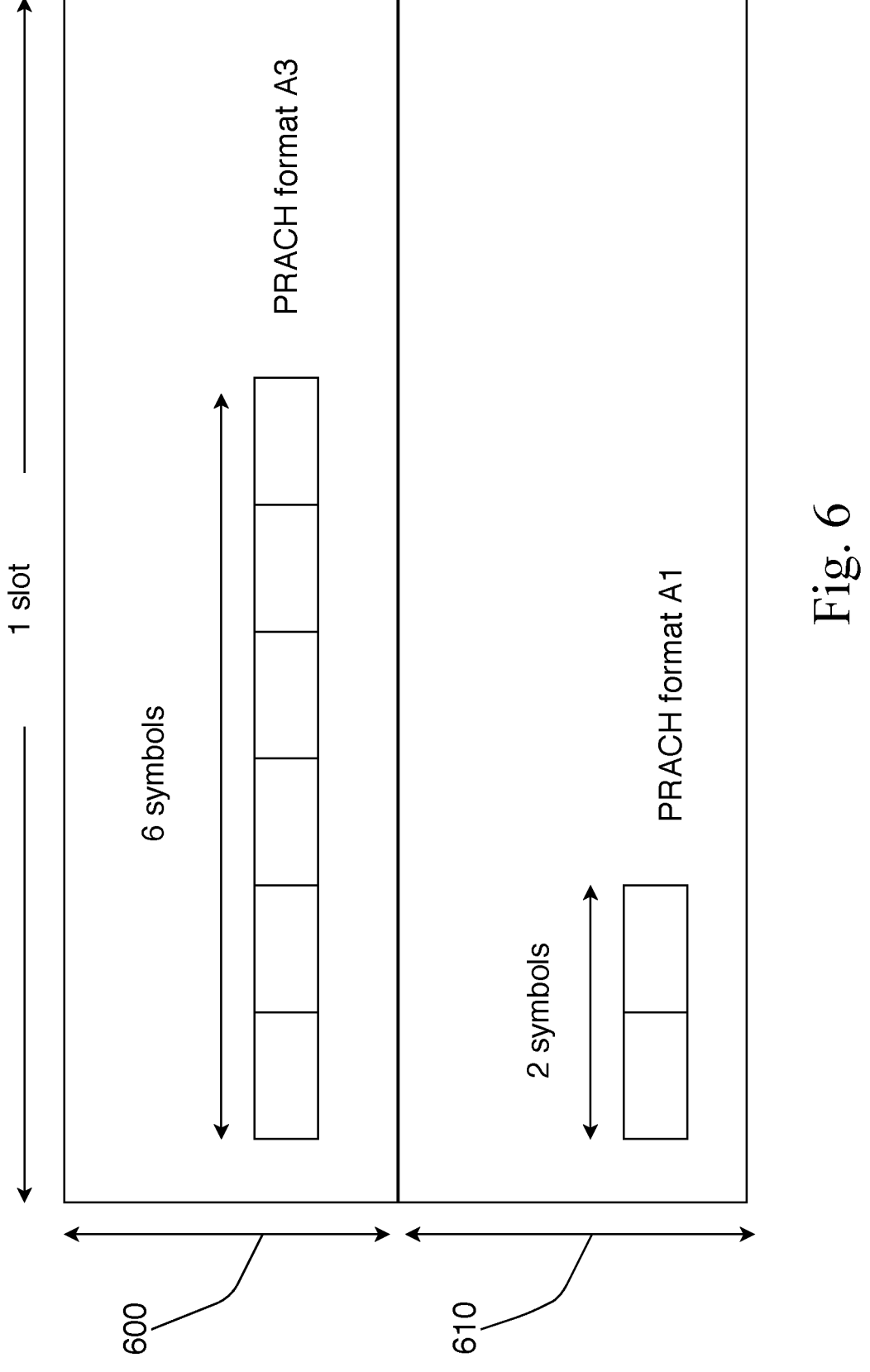
FIG. 6 is a diagram illustrating PRACH formats that may be utilized for RACH sub-bands according to various exemplary aspects.

FIG. 6 is a diagram illustrating PRACH formats 600 and 610 that may be utilized for RACH sub-bands according to various exemplary aspects. In some aspects, different PRACH formats may be configured for PRACH resources in different RACH sub-bands. In such an aspect, a separate prach-ConfigurationIndex IE may utilized for each sub-band to identify the PRACH format of that corresponding sub-band. Utilization of different PRACH formats advantageously allow for the efficient utilization of network resources since different PRACH formats have corresponding different coverage properties. For example, the maximum cell ranges associated with PRACH format A3(6 symbols) and PRACH format B4(12 symbols) can reach up to 3,516 meters and 3,867 meters, respectively, given a sub-carrier spacing of 15 kHz, which can be used by UEs at the cell edge to improve initial access performance. On the other hand, for UEs at the center of the cell, PRACH format A1/B1 with 2 symbols may suffice to meet the initial access performance requirements.

In some aspects, the PRACH format may be based on the location of the RedCap UE 110 within the cell (e.g., how far it is from the gNB). The greater the number of symbols in the PRACH resource, the larger the number of repetitions (e.g., 6 symbols =6 repetitions). Greater repetitions ensure improved carrier performance by ensuring that communications from the RedCap UE 1110 successfully reach the gNB 120A and the RACH procedure is successfully completed. FIG. 6 illustrates an example of different PRACH formats for two RA sub-bands 600 and 610 by using a separate prach-ConfigurationIndex IE for each sub-band.

Figure 7:
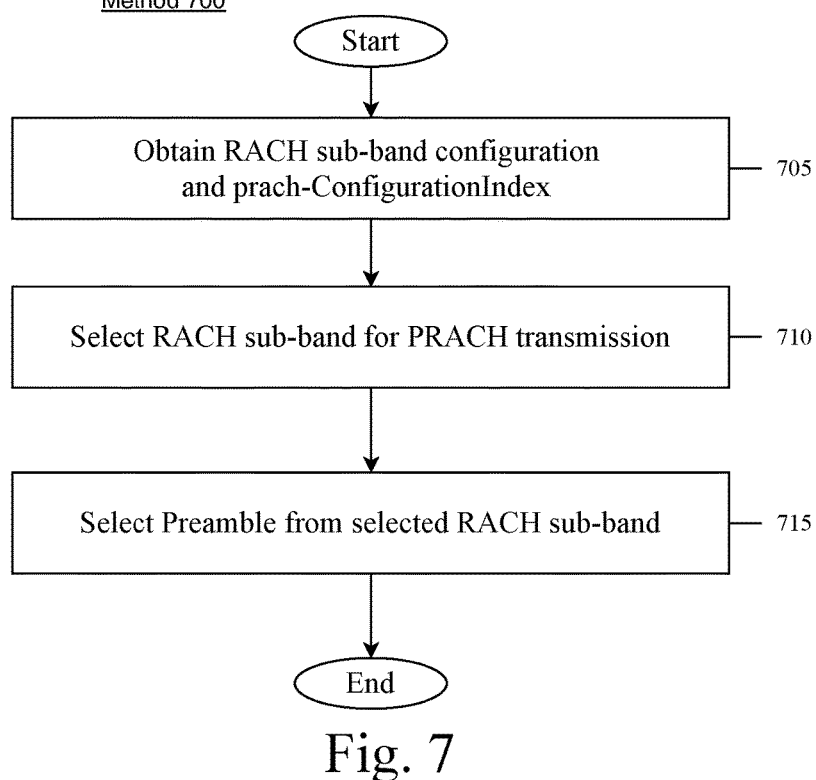
FIG. 7 is a flowchart illustrating a method of selecting a PRACH resource according to various exemplary aspects.

FIG. 7 is a flowchart illustrating a method 700 of selecting a PRACH resource according to various exemplary aspects. At 705, the RedCap UE 110 obtains the RACH sub-band configuration and the prach-ConfigurationIndex for its serving cell. This information is indicated in the SIB that the RedCap UE 110 receives from the gNB 120A and informs the UE which RACH sub-bands include the PRACH resources, the PRACH format(s), and the periodicity of the corresponding RACH sub-band with the PRACH resource.

In some aspects, in addition to the RACH sub-band configuration and the prach-ConfigurationIndex, the SIB1 may include additional configuration information. In some aspects, this additional information may be provided separately on a per RACH sub-band basis. In some aspects, such additional information may include one or more of (1) a random access response (RAR) window size (ra-Response-WindowSize), (2) a power-ramping factor, (3) an initial preamble power, (4) a maximum number of message 3 (Msg3) hybrid automatic repeat request (HARQ) transmissions, (5) a contention resolution timer (mac-Contention-ResolutionTimer), (6) the number of attempts per RACH sub-band, and/or (7) the number of Msg2/Msg3/Msg4 repetitions. With respect to the RAR window size, in some aspects, the window size may be a function of the RACH repetition level. For example, the window size may be based on the PRACH format selected for each respective RACH sub-band.

With respect to the number of Msg2/Msg3/Msg4 repetitions, the repetition number may be based on the PRACH format. For example, in the case of PRACH format A3 (e.g., exemplary PRACH format 600), which includes 6 symbols, the repetition number may correspond to the number of symbols (6 repetitions).

Figure 8:
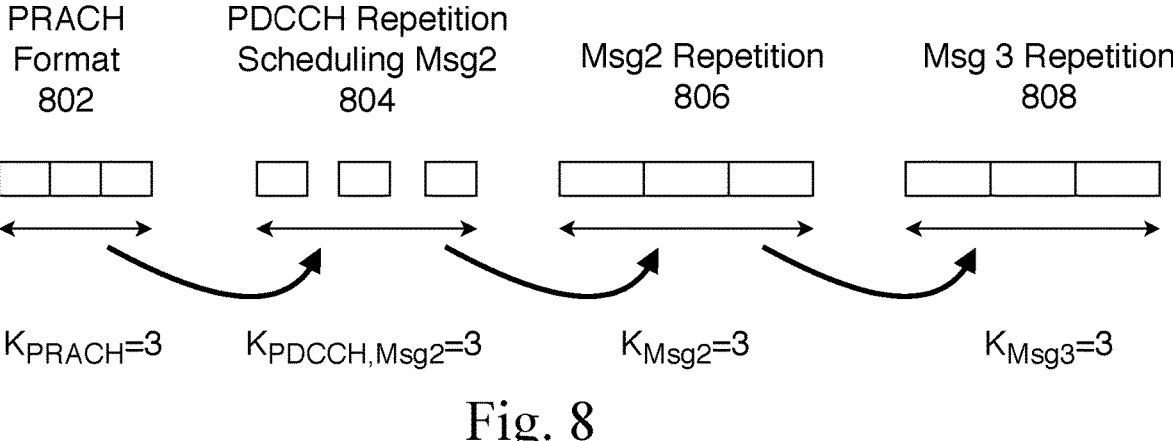
FIG. 8 is a diagram illustrating a determination of a message 2 (Msg2) and message 3 (Msg3) repetition according to various exemplary aspects.

In some aspects, the number of repetitions for each message (Msg2/Msg3/Msg4) may alternatively be defined as $K=K_{PRACH}+\Delta$, where K is the number of symbols in the PRACH format and $\Delta$ is a constant configured in the SIB transmission. It should be noted that a different $\Delta$ value may be configured to Msg2/Msg4 than for Msg3. FIG. 8 is a diagram illustrating a determination of a message 2 (Msg2) and message 3 (Msg3) repetition according to various exemplary aspects. FIG. 8 assumes that the $\Delta$ value configured is 0. As such, given a PRACH format 802 having 3 symbols, the PDCCH repetition scheduling of Msg2 804, the Msg2 repetition 806, and the Msg3 repetition 808 are all equal to 3. However, as noted above, these repetition value may be different depending on the configured $\Delta$ value.

Figure 9:
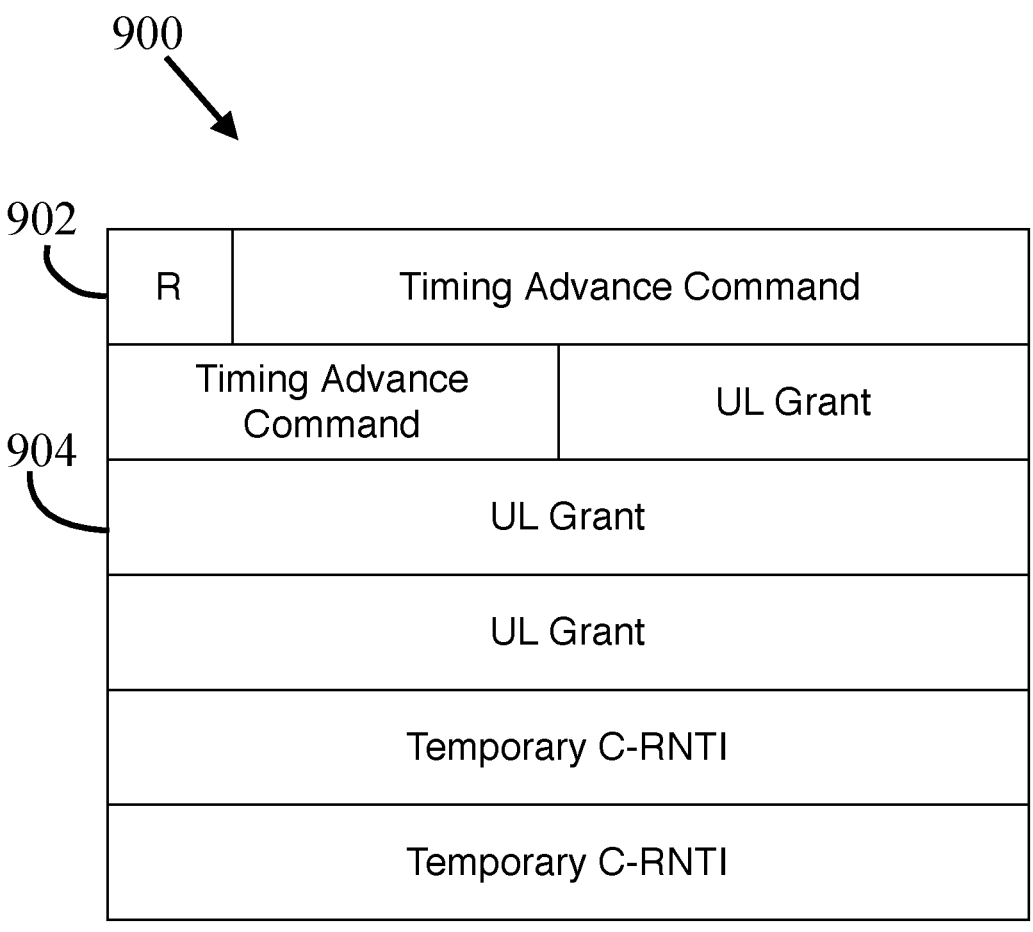
FIG. 9 is a diagram illustrating a random access response according to various exemplary aspects.

In some aspects, the number of Msg3 repetitions may alternatively be explicitly indicated in Msg2 (RAR). FIG. 9 is a diagram illustrating a RAR 900 according to various exemplary aspects. In such an aspect, the number of Msg3 repetitions may be determined by the R value 902 of the RAR. In some aspects, the R value 902 may indicate one of two possible repetition values. In some aspects, a predetermined number of bits of an uplink (UL) grant 904 in the RAR may alternatively indicate one of a set of predetermined repetition values. In aspects in which the number of Msg3 repetitions are configured by Msg2 as just explained, the number of Msg2 and Msg4 repetitions may be based on the PRACH format as explained above.

In some aspects, the transmission power for PRACH and Msg3 may be adjusted based on the corresponding repetition of the selected PRACH format. In such an aspect, abrupt jumps in the accumulated power levels due to the repetition level ramping are advantageously avoided and, therefore, reduce the impact of near-far effects.

Returning to FIG. 7, in addition to the configuration information provided at 705 discussed above, in some aspects, a list of reference signal received power (RSRP) thresholds may also be configured in the SIB as "RSRP-ThresholdsPrachInfoList-r17::=SEQUENCE (SIZE(1..N)) OF RSRP-Range." Up to N RSRP thresholds may be configured. As will be described below, the RSRP thresholds will be utilized in the selection of the RACH sub-band at 710.

At 710, the RedCap UE 110 selects a RACH sub-band for PRACH transmission based on a DL RSRP measurement by the RedCap UE 110. The RedCap UE 110 estimates the path-loss by averaging measurements of the RSRP based on a reference signal such as, for example, the SIB or a channel state information (CSI) reference signal. The measured RSRP is then compared with the RSRP thresholds configured in the SIB received at 705 to select the RACH sub-band. In some aspects, the RedCap UE 110 measures the RSRP of the detected strongest synchronization signal block (SSB). If the measured RSRP is less than the RSRP threshold of enhanced coverage level (PRACH format) N and UE supports (e.g., is capable of) enhanced coverage level N, then the UE selects the RACH sub-band that is associated with coverage level N at 710. If, however, multiple RACH sub-bands provide PRACH resources for the same coverage level, the Redcap UE 110 randomly selects one of these sub-bands. In some aspects, different selection probabilities may alternatively be configured for each RACH sub-band.

At 715, the RedCap UE 110 randomly selects one preamble from the selected RACH sub-band and transmits it to the gNB 122A to initiate the RACH procedure. In some aspects, for each RACH Sub-band, the RedCap UE 110 applies power ramping for all PRACH repetition levels, except for the highest repetition level. In some aspects, when RedCap UE 110 receives the RAR (Msg2) but fails contention resolution, the UE uses its current repetition level until the maximum number of attempts for that level has been reached. That is, if the UE fails contention resolution (Msg3 collision), then the UE can select another PRACH format and use the current repetition level until the max number of attempts are reached. However, randomly selecting other PRACH formats every time the UE fails contention resolution a waste of resources since there is no guarantee that the UE will succeed using those PRACH formats.

Those skilled in the art will understand that the above-described exemplary aspects may be implemented in any suitable software or hardware configuration or combination thereof. An exemplary hardware platform for implementing the exemplary aspects may include, for example, an Intel x86 based platform with compatible operating system, a Windows OS, a Mac platform and MAC OS, a mobile device having an operating system such as iOS, Android, etc. In a further example, the exemplary aspects of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method performed by a base station, comprising:
    broadcasting a system information block (SIB) identifying a plurality of random access channel (RACH) sub-bands of an uplink (UL) bandwidth and which of the plurality of RACH sub-bands includes physical random access channel (PRACH) resources; and
    receiving, from a user equipment, UE, a preamble from one of the plurality of RACH sub-bands selected by the UE; and
    transmitting a random access response (RAR) of message 2 (Msg2) to the UE, wherein a number of message 3 (Msg3) repetitions is indicated by a predetermined number of bits of an UL grant in the RAR configured to indicate one of a set of predetermined values for the number of msg3 repetitions and a number of Msg2 repetitions is equal to a sum of (1) a number of symbols corresponding to the PRACH format of the corresponding RACH sub-band and (2) a constant configured by the SIB.

2. The method of claim 1, wherein the SIB further includes one or more offset values indicating a starting position of each PRACH resource within a corresponding one of the plurality of RACH sub-bands that includes the PRACH resources.

3. The method of claim 2, wherein the one or more offset values is a single value.

4. The method of claim 2, wherein the one or more offset values includes a plurality of values corresponding to RACH sub-bands that include the PRACH resources.

5. The method of claim 4, wherein the separate values are with respect to a common reference point in the UL bandwidth.

6. The method of claim 1, wherein the SIB further includes a PRACH format configuration.

7. The method of claim 6, wherein the PRACH format configuration is different for each of the PRACH resources.

8. The method of claim 6, wherein the SIB further includes a repetition number configuration for a number of message 4 (Msg4) repetitions.

9. The method of claim 8, wherein the number of Msg4 repetitions is equal to the sum of (1) the number of symbols corresponding to the PRACH format of the corresponding RACH sub-band and (2) the constant configured by the SIB.

10. The method of claim 1, wherein the SIB further includes a list of reference signal received power (RSRP) threshold values.

11. A baseband processor configured to perform operations comprising:
    broadcasting a system information block (SIB) identifying a plurality of random access channel (RACH) sub-bands of an uplink (UL) bandwidth and which of the plurality of RACH sub-bands includes physical random access channel (PRACH) resources;
    receiving, from a user equipment (UE), a preamble from one of the plurality of RACH sub-bands selected by the UE; and
    transmitting a random access response (RAR) of message 2 (Msg2) to the UE, wherein a number of message 3 (Msg3) repetitions is indicated by a predetermined number of bits of an UL grant in the RAR configured to indicate one of a set of predetermined values for the number of msg3 repetitions and a number of Msg2 repetitions is equal to a sum of (1) a number of symbols corresponding to the PRACH format of the corresponding RACH sub-band and (2) a constant configured by the SIB.

12. The baseband processor of claim 11, wherein the SIB further includes one or more offset values indicating a starting position of each PRACH resource within a corresponding one of the plurality of RACH sub-bands that includes the PRACH resources.

13. The baseband processor of claim 12, wherein the one or more offset values includes a plurality of values corresponding to RACH sub-bands that include the PRACH resources.

14. The baseband processor of claim 13, wherein the separate values are with respect to a common reference point in the UL bandwidth.

15. The baseband processor of claim 11, wherein the SIB further includes a PRACH format configuration.

16. The baseband processor of claim 15, wherein the PRACH format configuration is different for each of the PRACH resources.

17. The baseband processor of claim 15, wherein the SIB further includes a repetition number configuration for a number of message 4 (Msg4) repetitions.

* * * * *